United States Patent [19]

Cleland

[11] Patent Number: 4,469,137

[45] Date of Patent: Sep. 4, 1984

[54] LIQUID METERING AND MIXING ASPIRATOR UNIT

[76] Inventor: Robert K. Cleland, 11051 Via el Mercado, Los Alamitos, Calif. 90720

[21] Appl. No.: 405,424

[22] Filed: Aug. 5, 1982

[51] Int. Cl.³ .............................................. F16K 19/00

[52] U.S. Cl. .................................... 137/893; 137/897; 222/133; 222/564; 239/310

[58] Field of Search ............... 137/892, 893, 896, 897, 137/888, 114; 222/133, 504, 136, 145, 564; 417/151, 198; 239/310, 318

[56] References Cited

U.S. PATENT DOCUMENTS

| | | | |
|---|---|---|---|
| 1,662,101 | 3/1928 | Bossi | 417/198 X |
| 2,544,539 | 3/1951 | Manders | 239/318 X |
| 2,625,176 | 1/1953 | Williams et al. | 222/136 X |
| 3,322,151 | 5/1967 | Giese et al. | 137/888 X |
| 3,445,067 | 5/1969 | Sheldall | 137/893 X |
| 3,558,099 | 1/1971 | Giorgi et al. | 222/504 X |
| 3,604,445 | 9/1971 | Jordan | 137/895 X |
| 4,210,166 | 7/1980 | Munie | 137/893 X |
| 4,311,160 | 1/1982 | Charland | 137/895 |
| 4,320,541 | 3/1982 | Neenan | 137/892 X |

FOREIGN PATENT DOCUMENTS 2347516 3/1975 Fed. Rep. of Germany ...... 222/145

*Primary Examiner*—Martin P. Schwadron
*Assistant Examiner*—Stephen M. Hepperle
*Attorney, Agent, or Firm*—Georges A. Maxwell

[57] ABSTRACT

A liquid metering and mixing aspirator including an elongate aspirator chamber with upstream and downstream ends, a small nozzle passage on an axis parallel with and radially offset from the axis and toward one side of the aspirator chamber and opening at the upstream end thereof adjacent said one side thereof, a liquid concentrate inlet port communicating with the upstream end portion of the aspirator chamber at the other side thereof, an enlarged vertical cylindrical mixing chamber with an upper end portion communicating with the downstream end of the aspirator chamber and a lower outlet end, water supply means connected with the nozzle passage and with a high pressure water supply and liquid concentrate supply means connected with the liquid concentrate port. The aspirator further includes liquid deflecting means at the upper end of the mixing chamber, spaced from the downstream end of the aspirator chamber and directing liquid flowing from the aspirator chamber radially and circumferentially downwardly in the mixing chamber.

4 Claims, 7 Drawing Figures

Fig. 3.
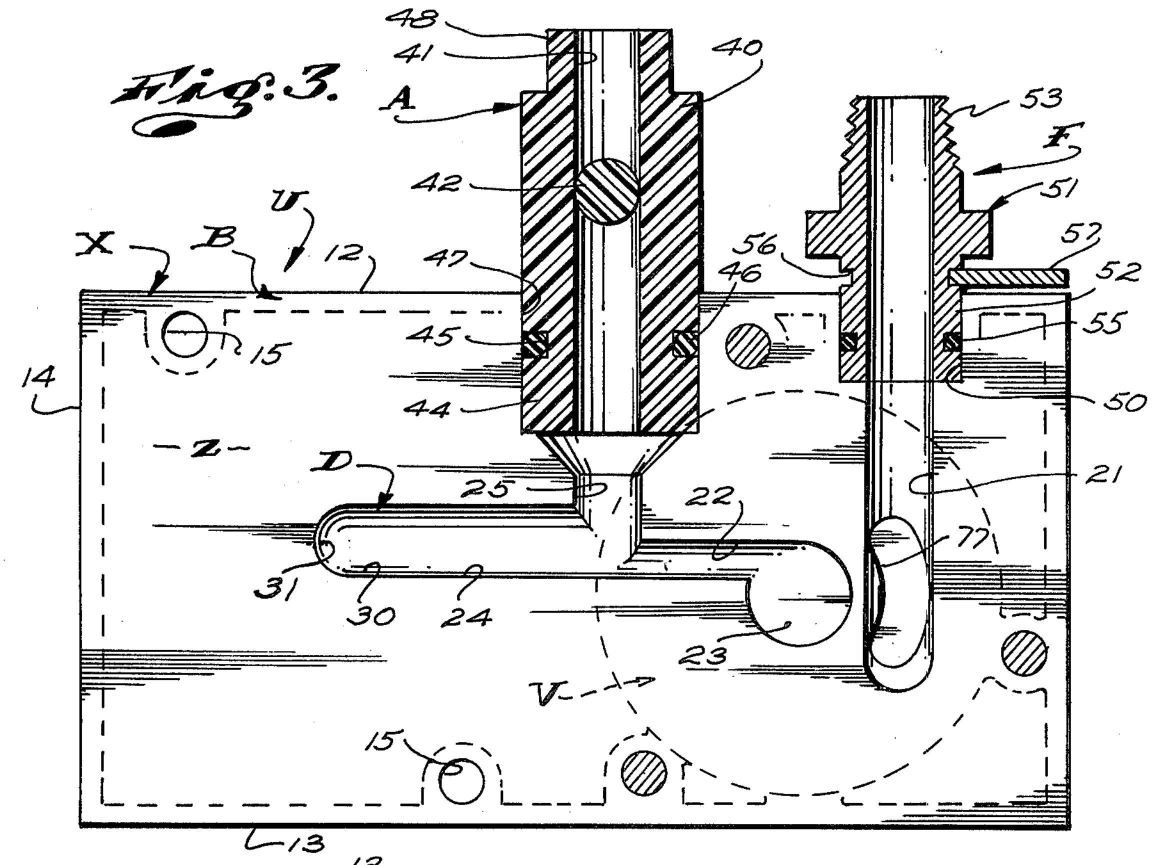
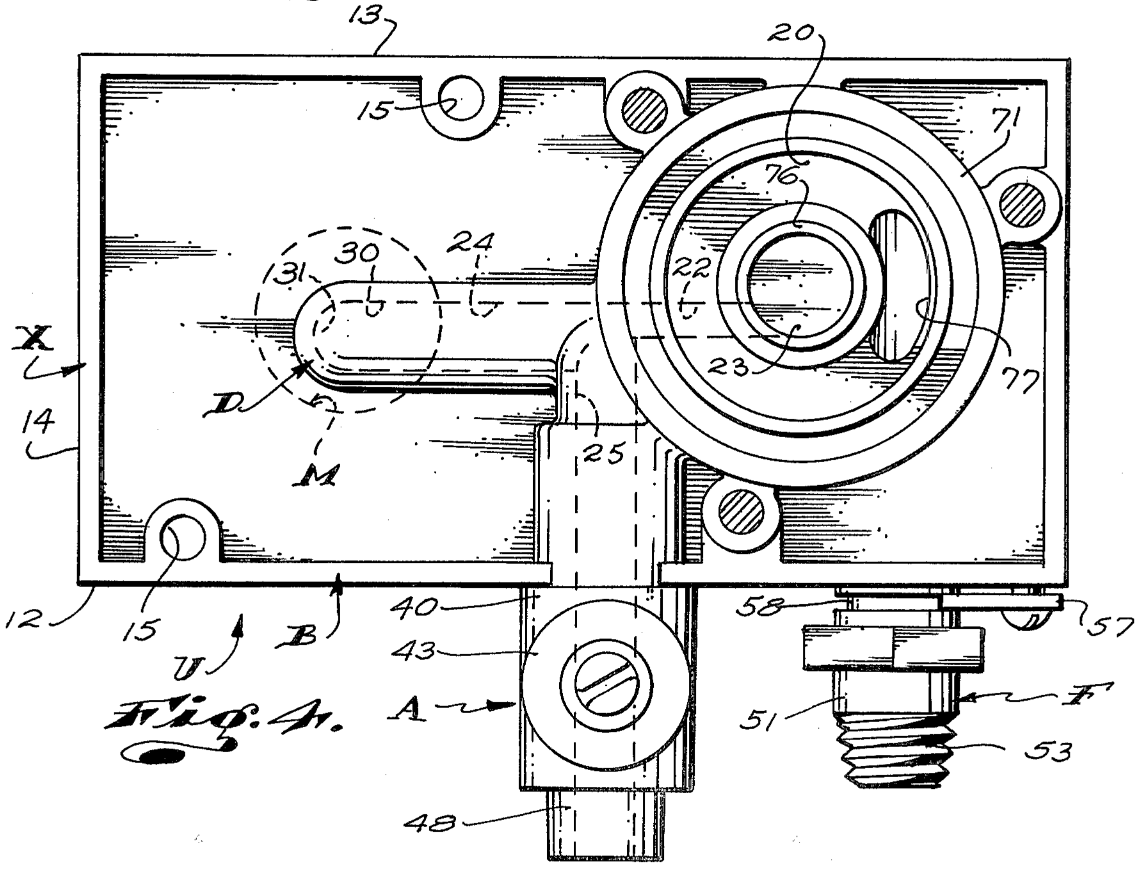
Fig. 4.

LIQUID METERING AND MIXING ASPIRATOR UNIT

This invention has to do with an improved liquid metering and mixing aspirator unit.

BACKGROUND OF THE INVENTION

In the art of vending and dispensing beverages, it is common practice to provide beverage dispensing machines with beverage supply tanks in which supplies of beverage are maintained and which are provided with automatically or manually operated dispensing valves to dispense the beverages into drinking glasses or containers, a serving at a time. The beverages received and dispensed by such machines are most commonly reconstituted beverages established by the measuring and mixing together of predetermined portions of water and beverage concentrates.

While throughout the art both dry or granulated and liquid beverage concentrates are used, liquid concentrates are most commonly used and are those concentrates which the liquid metering and mixing unit of the present invention is intended to work upon.

In the case of liquid beverage concentrates, there are concentrates which are very thin, of low viscosity and which are therefore such that they are easily moved or caused to flow and there are concentrates which are in the form of thick, viscuous syrups which are not easily moved or caused to flow. For example, those non-sweetened beverage concentrates, such as coffee or tea concentrates are characteristically very fluid and free-flowing while those sweetened and sugar ladened fruit flavored beverage concentrates, such as fruit punch, are characteristically very viscuous and slow flowing. The viscosity and flow characteristics of different brands and flavors of beverage concentrates are subject to notable differences and the work energy required to cause them to flow, as for the purpose of delivering or dispensing measured volumes thereof, differs widely.

In practice, the proportional volumes of concentrates and water required to reconstitute beverages vary from 5 to 20 parts of water to each part of concentrate, depending upon the strength of concentrate and the kind or type of beverage produced thereby.

Throughout the years, the prior art has provided beverage dispensing machines with various apparatus and/or means to automatically mix together and deliver into the machines predetermined volumes of water and liquid beverage concentrates whereby the inconvenience, expenditure of time and potential human error expended and experienced in the practice of manually measuring and mixing the ingredients is avoided.

To date, the most effective and practical of those automatic mixing means provided by the prior art have utilized and have been characterized by aspirator devices or units which are suitably connected with pressurized water supplies (such as municipal water service systems) and which are connected with supplies of liquid beverage concentrate in or positioned near the dispensing machines. Such automatic mixing means commonly include an on and off valve to control the flow of water into and through the aspirator devices and the devices are such that the volumes of water caused to flow through and which are delivered by them draw and carry proportional volumes of the concentrates. In those instances where those thin, unsweetened beverage concentrates are being worked upon, effective mixing of the water and beverage concentrates occurs substantially instantly and automtically when the two liquids are brought together. On the other hand, in those instances where thick syrupy sweetened beverage concentrates are worked upon, the mere bringing together of the two liquids within the aspirators does not result in effective mixing of the liquids and separate and/or special means, downstream of the aspirators, must be provided to assure complete and proper mixing of the liquids.

The aspirators adopted and used by the prior art to deliver water and beverage concentrates into beverage dispensing machines have been of very standard "text-book" design and construction and have proven to be quite ineffective. Typically, those aspirators have consisted of straight cylindrical small diameter water nozzle tubes or passages with receiving ends connected with related water supplies and other discharge ends at or within the inlet or closed ends of short cylindrical large diameter mixing tubes or chambers; and liquid supply tubes or ducts communicating with supplies of liquid concentrate and opening at one side of the closed end portions of the mixing tubes or chambers. The other or discharge ends of the mixing tubes or chambers simply open directly into a space defined by some related structure to effect free discharge of the liquids from the mixing tubes or chambers. Concentric relationship of the nozzle tubes or passages and the mixing tubes or passages has not been deviated from and the limited use of the motive force of the water flowing through the aspirators by premature and ineffective discharge of the liquids from the discharge or open ends of the short mixing tubes or chambers has not been deviated from.

With few exceptions, those aspirators which have been adopted and used by the prior art (within those operating parameters inherent in the environments in which they are used) are capable of drawing about 8", plus or minus 4" of mercury. Such limited effectiveness of efficiency has resulted in a situation wherein certain of the heavier and more viscuous syrup concentrates cannot be effectively moved and worked upon by the automatic aspirator type mixing means provided by the prior art and has resulted in a situation where the design and arrangement of all of the components and/or parts of and for such water and beverage concentrate mixing means are controlled and limited by the notable inefficiency and ineffectiveness of the aspirators.

Typically, the automatic aspirator type mixing means for beverage dispensing machines which the prior art has provided have been designed and fabricated in a step-by-step manner with each phase and/or function handled and performed by some separate means or structure. As a result, such concentrate mixing means have characteristically consisted of elongate series of components and parts which are inherently slow to operate. That is, they are such that they must be operated substantial periods of time before they are completely primed and fully operational. The foregoing has materially limited the practical use of automatic water and beverage concentrate aspirator type mixing means.

It has been noted that in the art here concerned with, the prior art has not come forth with one or more standard commercially available aspirator devices or units which might be produced and offered for sale in the same manner that standard commercially available valves and pressure regulators are produced and made available. Instead, in each instance or case where an aspirator is required, a special aspirator unit or device is designed and produced, which will effectively handle a particular type or class of concentrate and will effectively deliver a desired proportional mix of concentrate and water when said water is delivered to the structure within a limited range of pressure. The foregoing is understood and believed to be the result of the fact that no single aspirator or device has been designed, produced and offered for sale which is sufficiently effective and efficient throughout a wide range of operating parameters for universal application in this art and the art has therefore been left to improvise and/or design special aspirators whenever the provision and use of an aspirator is required.

OBJECTS AND FEATURES OF THE INVENTION

An object of my invention is to provide a new and improved aspirator type water and beverage concentrate mixing unit for proportionally mixing water and liquid beverage concentrate and to deliver beverage reconstituted thereby.

It is an object and feature of my invention to provide a unit of the general character referred to above which is highly effective and efficient and which operates (within the operating parameters in the environment established by or found in beverage dispensing machines) to draw in excess of 25" of mercury and which is therefore capable of effectively and accurately drawing predetermined metered volumes of substantially all commercially available liquid beverage concentrates and of accurately combining those concentrates with predetermined metered volumes of water throughout a wide range of ratios of concentrate and water.

Another object and feature of this invention is to provide a unit of the general character referred to in the foregoing which includes an elongate cylindrical aspirating tube or chamber with a closed inlet end and an open discharge end, a liquid concentrate tube or passage communicating with one side of the mixing chamber at its closed end portion and a water nozzle tube or passage at said closed end of the mixing chamber connected with a pressurized water supply and directing a high pressure jet of water into and through that chamber on an axis radially offset from the axis of the chamber and adjacent to the side of the chamber opposite the liquid concentrate inlet tube or passage.

Still another object and feature of the invention is to provide a mixing unit of the character referred to which includes mixing means downstream of the aspirator chamber to mix together the water and concentrate issuing from the aspirator chamber and which utilizes the mass inertia of the liquids flowing downstream through the construction to effect mixing thereof and to supplement the primary aspirating function of the unit.

It is an object and feature of the invention to provide a unit of the general character referred to in the foregoing wherein said mixing means downstream of the aspirating chamber to mix the liquids includes an enlarged, elongate substantially vertical mixing chamber having an upper receiving end communicating with the discharge end of the aspirating chamber and water jet deflecting means in alignment with the jet of water flowing through and from the aspirator chamber and directing that water downwardly into the mixing chamber to establish and maintain a downward vortex flow of liquids through the mixing chamber, to an open lower discharge end thereof.

Another object of the invention is to provide an aspirator unit of the character referred to above wherein the elongate mixing chamber is a downwardly and radially inwardly tapered cylindrical chamber, the length, taper and diameter of the lower end of which is such that vortex flow of liquids downwardly through the mixing chamber is accelerated, the flow of liquid from the chamber is unrestricted and the work energy of the water introduced into and flowing through the construction is substantially spent when the liquids reach said lower open end of the mixing chamber.

Yet another object and feature of the invention is to provide an aspirator type mixing unit of the character referred to which includes an on and off valve to start and stop the flow of water which valve includes a valve chamber adjacent and communicating with the nozzle tube or passage whereby said valve and passage are sufficiently closely coupled so that upon opening and closing of the valve, the aspirator commences and terminates operation substantially instantly without appreciable delay.

It is still another object and feature of the invention to provide an aspirator type mixing unit of the character referred to above which includes fluid metering valve means to adjust the metered volume of beverage concentrate flowing through the concentrate tube or passage when the unit is operating and/or a manually adjustable water pressure regulator donwstream of the on and off valve to regulate the pressure and resulting volume of water flowing into and through the unit whereby the unit can be easily and effectively adjusted to deliver different desired volumes of water and beverage concentrate when put into operation and as circumstances require.

Finally, it is an object and feature of this invention to provide an aspirator type mixing unit of the character referred to in the foregoing which is made up of a very limited number of easy and economical to mass produce and assemble parts and which is such that it can be advantageously used in and made a standard part of most beverage mixing and dispensing machines and/or apparatus in which water and liquid beverage concentrates are combined and mixed together.

The foregoing and other objects and features of this invention will be fully understood from the following detailed description of the invention throughout which description reference is made to the accompanying drawings.

DESCRIPTION OF THE DRAWINGS

FIG. 3 is an enlarged detailed sectional view taken substantially as indicated by line 3—3 on FIG. 1;

FIG. 4 is an enlarged detailed sectional view taken substantially as indicated by line 4—4 on FIG. 1;

DETAILED DESCRIPTION OF THE INVENTION

Figure 1:
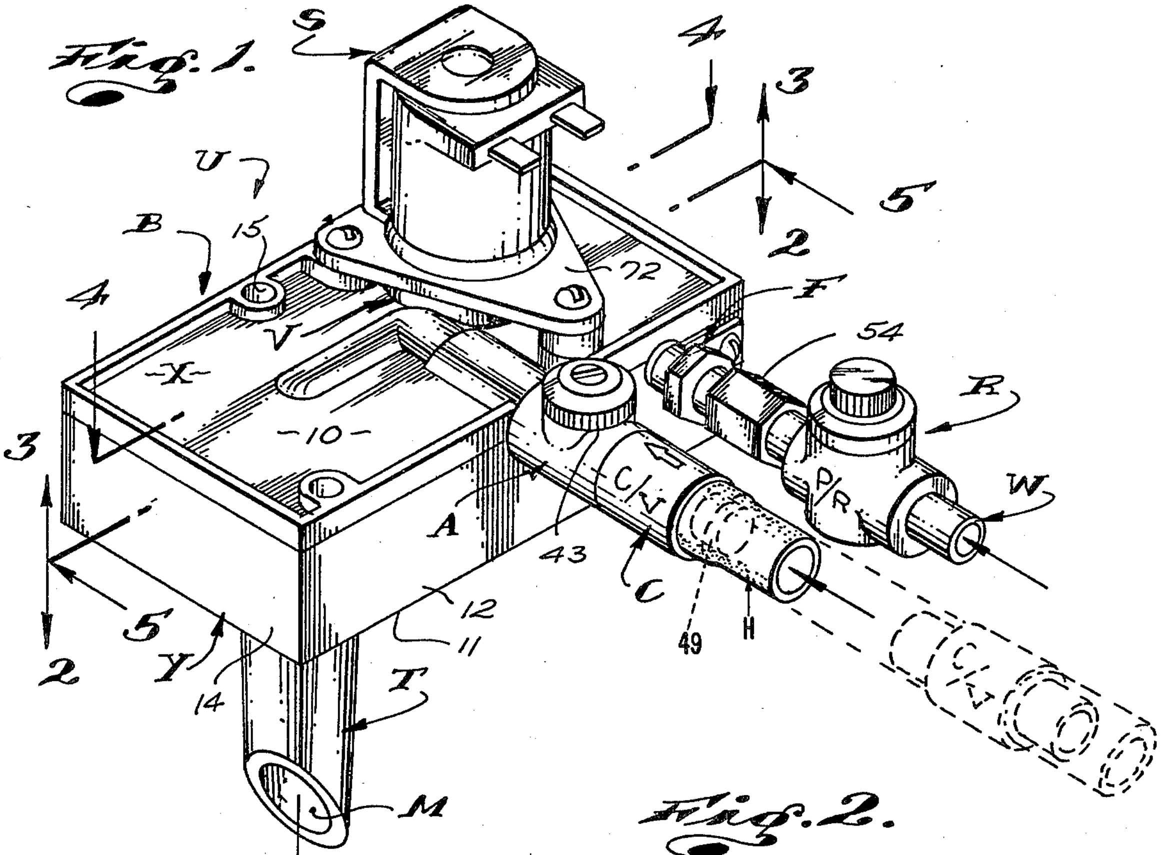
FIG. 1 is an isometric view of the invention.
Figure 2:
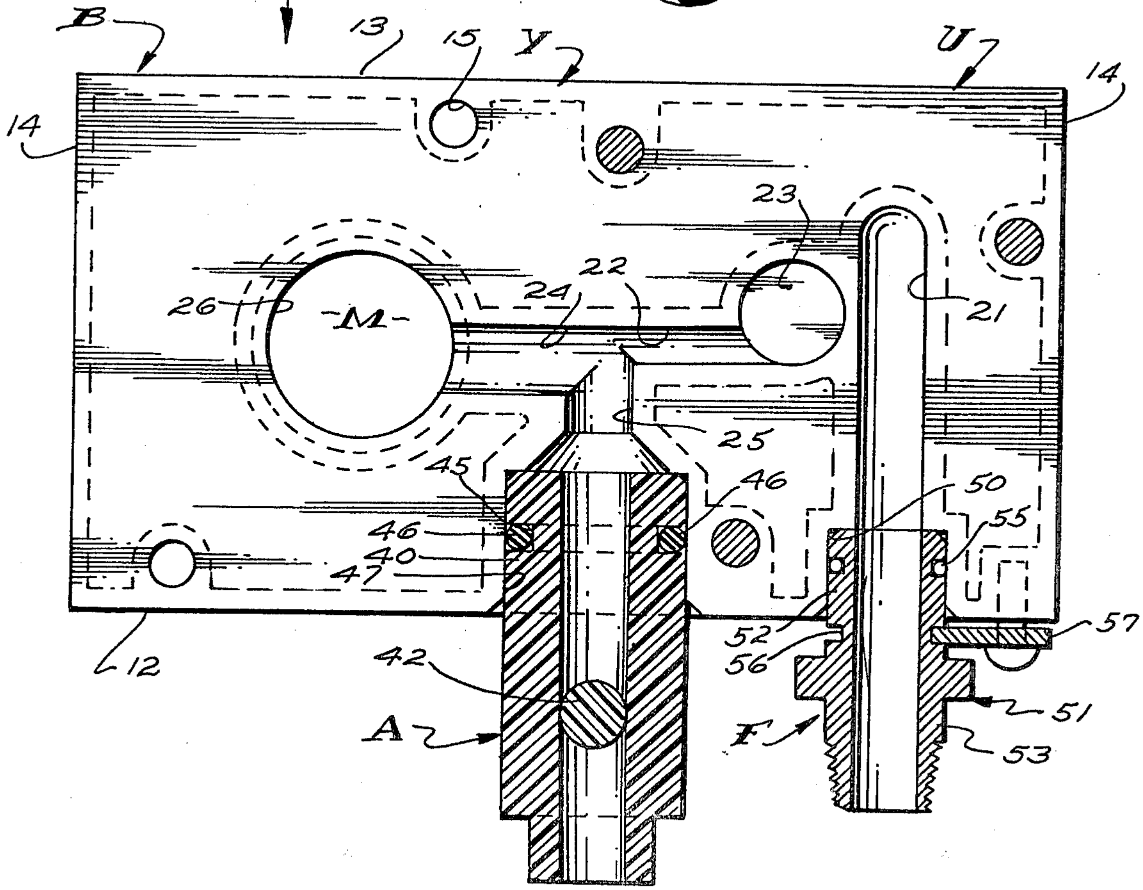
FIG. 2 is an enlarged detailed sectional view taken substantially as indicated by line 2—2 on FIG. 1.

Referring to FIG. 1 of the drawings, the mixing unit U that I provide includes an elongate, rectangular, block-like body B having horizontal top and bottom sides 10 and 11 and vertical front, rear and end sides 12, 13 and 14. A solenoid unit S of an electrically operated on and off valve means V is mounted on and projects upwardly from the top side of the body B at one end portion thereof. An elongate, vertical, downwardly opening mixing tube T, defining a mixing chamber M, depends from the bottom of the body B, at the other end portion thereof. At or related to the front side 12 of the body B is a manually adjustable concentrate metering valve A, a check-valve C occurs upstream of the valve A and an elongate suction hose H extends from the valve C to a concentrate supply (not shown). A pressure regulator R, connected with the discharge end of a water supply tube or line W, is coupled with the front side of the body adjacent the valve V by means of a quick disconnect fitting F.

The body B is provided with vertical fastener receiving through openings 15 to facilitate mounting the unit on a suitable supporting structure (not shown).

Referring to FIGS. 2 through 7 of the drawings, the body B is shown established of upper and lower body sections X and Y. The sections X and Y are injection molded plastic parts with flat horizontal opposing surfaces Z which are cemented or welded together and which are formed to establish a valve chamber 20 for the on and off valve means V, a water supply passage 21 which extends between and connects the chamber 20 and the quick disconnect fitting F, an elongate cylindrical nozzle passage 22 with inlet and outlet ends, a receiver chamber 23 between and communicating with the chamber 20 and the passage 22, an elongate, cylindrical aspirator passage or chamber 24 on an axis parallel with the passage 22 and with its inlet end communicating with the outlet end of the passage 22, a concentrate inlet port 25 between and communicating with the inlet end portion of the aspirator chamber 24 and the metering valve A which is quick disconnected with the front side of the body B, an elongate, cylindrical, vertical cavity 26 communicating with the outlet end of the aspirator chamber 24 and with the upper end of the mixing tube T and cooperating with said tube to define the upper end portion of the aforementioned mixing chamber M. In addition to the foregoing, the structure includes water jet deflecting means D at the upper end of the mixing chamber M and within said cavity 26.

If considered in a piecemeal manner and/or as a mere catalog of parts, most of the parts and portions of the structure recited above are likely to be found in some aspirator type mixing units provided by the prior art. However, the form, dispositioning and arrangement of the above recited parts is unique and distinct from that which is taught and practiced by the prior art, as will be apparent from a study of the drawings and as will be particularly noted and described in the following.

It is to be particularly noted that the elongate, cylindrical nozzle passage 22 is notably smaller in diameter than the elongate, cylindrical aspirator chamber 24 and that its central longitudinal axis is radially offset from the central longitudinal axis of the chamber 24 so that the outlet end of the nozzle passage 22 occurs radially offset from the center of and at one-half of the inlet end of the chamber 24. In the case illustrated, the diameter of the passage 22 is substantially equal to the radius of the chamber 24 and occurs at or is aligned with the rear half of the chamber 24, with reference to the front and rear sides 12 and 13 of the body B.

With the above relationship of the nozzle passage 22 and aspirator chamber 24, when a jet of water is caused to flow from the outlet end of the passage 22 and into and through the chamber 24, the rear side of the jet of water is directed to flow along and is in contact with the rear side of the chamber 24. The surface effect between the jet of water and the surface of the chamber, at the rear side thereof, tends to hold and maintain a substantial portion of the jet of water contained or concentrated at and along the rear side of the chamber 24 and thereby maintains that portion of the water moving longitudinally through the chamber 24 at high velocity. The noted surface effect is also understood and believed to cause a substantial portion of the water (of the jet of water) to spread and/or fan out radially upwardly and forwardly and radially downwardly and forwardly about the rear half of the chamber 24 as it moves longitudinally therethough and toward the outlet or downstream end of the chamber 24. Such spreading or fanning of a portion of the jet of water is understood and believed to establish an extensive surface area of water moving rapidly downwstream within the outlet end portion of the aspirator chamber. Such extensive surface area of moving water is particularly effected to establish a substantial minus pressure within the inlet portion of the aspirator chamber, at the front side thereof and at the concentrate inlet port 25, which, as noted above and as shown in the drawings, opens at the front side of the inlet end portion of the aspirator chamber 24.

In comparison tests made with the structure of this invention and with a similar test structure wherein the nozzle passage was arranged concentric with the aspirator chamber, the structure of this invention drew a minus pressure on liquid concentrate at the concentrate inlet port which was more than five inches of mercury greater than the minus pressure on the same concentrate at the inlet port of the test structure.

During the above noted tests, it was observed that the water and concentrate discharged from the outlet or downstream end of the aspirator chamber of the test structure was notably diffused and commingled and much of it appeared to travel at a slow rate while in the case of the structure embodying the present invention, a notable portion of the jet of water flowing from the discharge or downstream end of the aspirator chamber 24 was substantially undiffused and moved at high velocity. The remaining water was diffused and mixed with concentrate as it flowed from the aspirator chamber with greater density of concentrate at the front side of the chamber.

The above noted test results or observations not only suggest that superior results are attained in the structure of the invention by virtue of the noted surface effect between the jet of water and the surface of the aspirator chamber, but also suggest and have led me to understand and believe that in aspirators of the general character or class here concerned with, in which the nozzle passages are concentric with the aspirator chambers and the jets of water are in very close proximity to the concentrate inlet ports and are uncontained or unrestricted in any manner, the slow moving, heavy and viscous liquid concentrates drawn into the aspirator chambers by the minus pressures generated by the jets of water and which move into contact with the uncontained jets of water cause the jets of water to rapidly break up and diffuse, thus rapidly and wastefully expending a great portion of the energy of or within the jets of water to effect useless diffusion thereof.

Accordingly, in the present invention, by radially offsetting the nozzle passage 22 and jet of water to the side of the aspirator chamber 24 opposite the side thereof at which the concentrate inlet port 25 occurs, notably less work energy of or within the jet of water is wastefully expended to unnecessarily break up and diffuse the jet of water than is expended and wasted in common aspirator structures where the jets of water are concentric with the aspirator chambers.

In further considering the present invention, it is to be noted that the upper one-half of the aspirator chamber 24 is extended axially downstream from the outlet end of the chamber 24 and into and across the downwardly disposed top surface of the cavity 26 to establish a downwardly opening water jet directing channel 30. The channel 30 continues from the aspirator chamber 24 into the cavity 26 to terminate at or near to the top center of the cavity and therefore, at or near the top center of the mixing chamber defined by said cavity and its related tube T. The downstream end of the cannel 30 is formed with a downwardly turned semi-spherical water deflecting surface 31. The channel 30 and deflecting surface 31 establish an effective and preferred form of deflecting means D, the purpose and function of which will be described in the following.

It is to be noted that the cavity 26, defining the upper end portion of the mixing chamber M, is substantially larger in diameter than the aspirator chamber 24 and is such that the portion of the mixing chamber established or defined thereby freely receives the liquids (water and concentrate) issuing from the aspirator chamber 24. The remainder or that portion of the mixing chamber M below the cavity 26 is defined by the tube T. The upper end portion of the tube is removably frictionally engaged in a downwardly and radially inwardly opening bore 33 at the bottom of the body B, about and below the cavity 26. The portion of the mixing chamber M defined by the tube is tapered downwardly and radially inwardly at from 2° to 5° and is shown as having a truncated lower open end. The lower open end is preferably no less in diameter than the diameter of the aspirator chamber so that free flow of fluids from the chamber M is assured and/or so that the establishment of an undesirable back pressure in and through the construction will not develop.

The diameter, length and vertical extent and the angle of taper of the mixing chamber M can vary widely. By varying and adjusting one or more of the above noted factors, the chamber M can be made to effectively and thoroughly mix the water and concentrate delivered into it and to effectively supplement and/or enhance the aspirating function of the structure provided.

When the mixing unit U that I provide is operating, a portion of the undiffused jet of water issuing from the downstream or outlet end of the aspirator chamber 24 is conducted and/or directed across the top of the chamber M in and by the channel 30 of the deflecting means D and is directed radially outwardly, downwardly, circumferentially clock-wise into the upper end of the chamber M by the deflecting surface 31. The water thus introduced into the upper end of the chamber establishes an induced vortex flow of liquids down through and about the interior surface of the chamber M. Due to the taper of the chamber, the induced vortex flow is accelerated or is at least maintained throughout the length of the chamber. The remainder of the diffused water and concentrate flowing from the aspirator chamber into the mixing chamber M is directed into and across the upper end portion of the chamber M to the wall or surface of the chamber and combines with the water directed downwardly and circumferentially in the chamber by the means D whereby all of the liquids flowing from the chamber 24 into the mixing chamber are combined and thoroughly mixed in the chamber M before they reach and flow from the lower open end of the chamber.

It is to be particularly noted that the work energy of or in the portion of the jet of water issued by the nozzle 22 and flowing into the upper end of the mixing chamber M and which is utilized to induce the vortex flow of liquids in the chamber M effectively works to supplement the aspirating function of my mixing unit since the noted water jet and gravity induced vortex flow of liquids in and down through the mixing chamber necessarily induce a minus pressure in the upper end portion of that chamber, which minus pressure supplements the minus pressure in the chamber 24 and tends to draw and/or scavenge liquids through and from the chamber 24.

In tests conducted with mixing units embodying this invention, when the tube T was removed and the mixing chamber M was substantially eliminated, a loss of minus pressure equivalent to as much as eight inches of mercury was experienced. In other tests, several small vertically spaced air vent openings were made in the lower half of the tube T. The vent openings were closed with tape. When the lowermost vent opening was opened by removing the tape, a noticeable loss of minus pressure on liquid concentrate at the concentrate inlet port occurred. When each next higher vent opening was opened in a similar manner, the loss of minus pressure increased. When the uppermost vent opening, at or near the center of the tube, was opened, the loss of minus pressure at the concentrate inlet port was close to eight inches of mercury. While such a notable loss in efficiency was experienced, the effective mixing of the water and concentrate in the chamber was not adversely affected.

The above noted simple tests tended to clearly demonstrate the fact that the means D and mixing chamber M not only effectively mixed the water and concentrates flowing from the aspirator chamber 24, but utilize that residual work energy of the water flowing through and from the aspirator chamber and into the mixing chamber to further aspirate and more effectively utilize the work energy delivered into the construction by the inflowing water.

While I consider the above noted and disclosed special details and features of my invention to be most important, the structure that I provide includes a number of additional novel details and features which notably add to and enhance the utility of my new construction.

One of the above referred additional novel features resides in the provision of the previously noted metering valve A at the concentrate inlet port 25. The valve A is a simple manually operated valve which can be adjusted between fully opened and closed positions to restrict and regulate the volume and rate of liquid concentrate flowing through it. The vavle A includes an elongate body 40 with inlet and outlet or upstream and downstream ends and a central longitudinal flow passage 41. The body 40 carries a suitable valve member 42 which projects into the flow passage 41, intermediate the ends thereof. The valving member is carried by or suitably coupled with an operating stem (not shown) sealingly carried by and accessible at the exterior of the body and on which a suitable manually engageable operating handle 43 is engaged. In the form of the invention illustrated, the downstream end portion 44 of the valve body 40 is cylindrical and formed with a radially outwardly opening groove 45 in which and O-ring seal 46 is engaged. The portion 44 of the valve is slidably and sealingly engaged in a large diameter forwardly opening cylindrical socket 47 formed in the front side of the body B concentric and communicating with the concentrate inlet port. The portion 44, O-ring 46 and socket 47 establish a simple, plug-in type of quick disconnect between the valve A and the body B, thus providing a structure wherein the metering valve A is closely related to the concentrate inlet port. The noted relationship of the valve A and the body B is such that the valve A is integrated with the body B when the construction is assembled and in condition for use, thus providing a unitized structure.

In practice, the groove 45 and O-ring 46 can be eliminated and the portion 44 can be suitably cemented in the socket 47, without departing from the broader aspects and spirit of my invention.

The other or upstream end of the valve body 40 is provided with a cylindrical, tubular female extension or nipple 48 which can be engaged in and coupled directly with the outlet end of the concentrate suction hose H but which is shown engaged in the downstream or outlet end of the noted check-valve C to prevent concentrate in the construction and in the hose from draining from the construction and the hose when the construction is not in operation.

The check-valve C has a socket (not shown) in its downstream end which receives the nipple 48 and has a nipple 49 at its upstream end which is frictionally engaged in the outlet end of the hose H.

In practice, if desired, the valve C can be advantageously positioned at the inlet end of the hose H, remote from the valve A, or can be engaged in the hose at any desired location between the ends of the hose, as desired or as circumstances require.

Since the valves A and C and the hose H are only subjected to ambient and minus pressures which tend to maintain them assembled, snug frictional sealing engagement between the interengaged or interrelated parts and portions thereof is all that is required to insure against undersired separation or diconnection of the assembled parts.

It is to be understood that while both the valves A and C are desirable, one or both of those valves might be eliminated from the construction in certain circumstances without departing from the broad aspects and spirit of the invention. If the valve A is not included, a tubular nipple, engageable in the socket 47, is provided to couple the hose H to the body.

Another novel feature of my invention is the provision of the previously noted and illustrated pressure regulator R for the water supply and that novel quick disconnect structure F provided to connect the regulator with the body B (in communication with the water passage 20). The pressure regulator R is a standard manually adjustable water pressure regulator and can be selected from a large number of different commerically available pressure regulators provided for and regularly used in beverage dispensing machines and the like.

The quick disconnect F comprises an elongate male-male nipple fitting 51 with a cylindrical dowstream nipple 52 manually slidably engaged in a forwardly opening cylindrical socket 50 in the front side of the body B concentric and communicating with the water passage 20. The fitting 51 next includes a threaded upstream nipple 53 to connect directly with the downstream side of the pressure regulator R or, if necessary and as shown, with a fluid coupling part 54. The nipple 52 has a first groove 55 which occurs within the socket opening 50 and in which an O-ring seal is engaged to seal between the nipple and the socket. The nipple 52 has a second groove 56 which occurs forward of the front side of the body and in which a retaining plate 57, carried by the body, is normally engaged. The retaining plate 57 is screw-fastened to the body B and is such that upon loosening the screw, the plate can be pivoted into and out of engagement in the groove 56, to lock or unlock the fitting in engaged relationship in the body.

In practice, if one would prefer to locate the regulator R remote from the body, it can be connected with the fitting F by means of an elongate coupling tube or line without departing from the spirit of the invention.

It is to be noted and understood that in some instances where the supply of water is at a desired and constant operating pressure, the regulator might not be required. In such a case, the water supply line W can be connected directly with the fitting F. If the regulator R is not required and is eliminated, suitable adjustment of the structure can be provided by the valve A.

With the form of the invention illustrated and with that structure which has thus far been described, it will be apparent that connecting and disconnecting the body B with the supply of water and with the supply of concentrate, as for the purpose of servicing the construction or servicing the other structure with which it is related, can be effected easily and quickly.

It is to be noted that when the concentrate supply is disconnected from the body B, the vavle A can be closed, thus preventing the spillage of concentrate that might be in the hose and within the check-valve C, should the hose be laid down.

Figure 5:
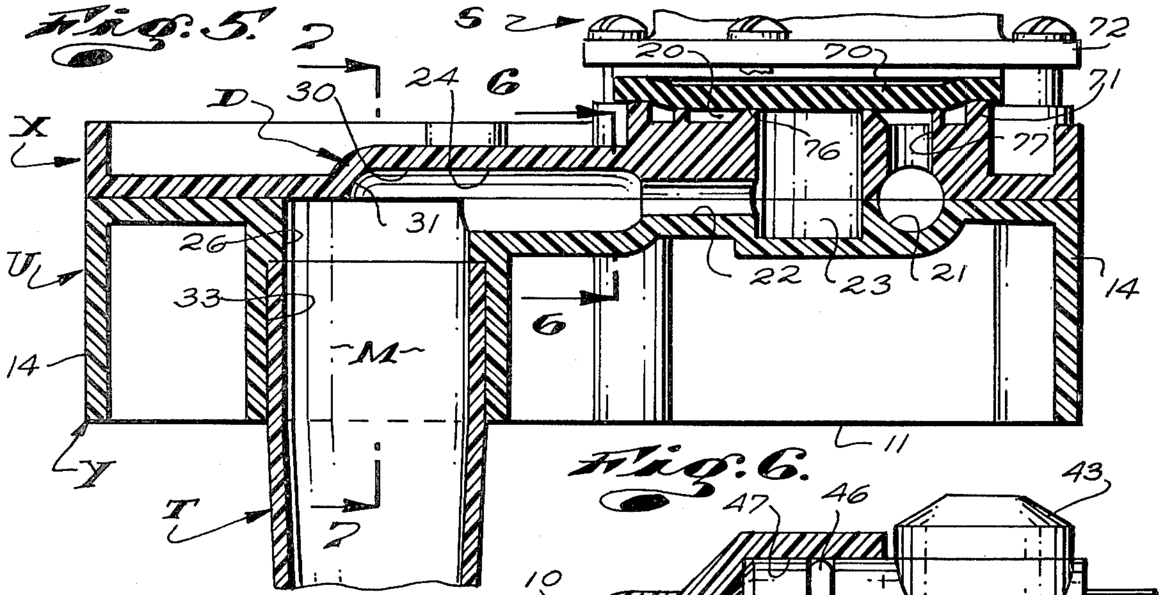
FIG. 5 is an enlarged detailed sectional view taken substantially as indicated by line 5—5 on FIG. 1.
Figure 6:
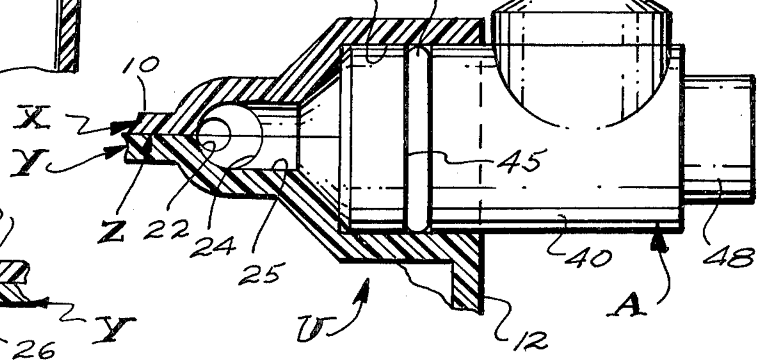
FIG. 6 is a sectional view taken as indicated by line 6—6 on FIG. 5.
Figure 7:
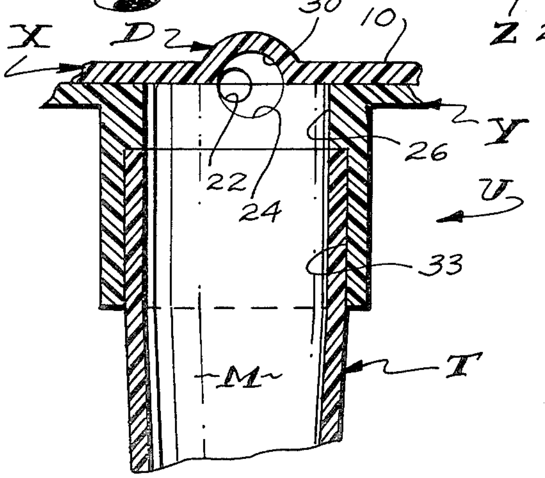
FIG. 7 is a sectional view taken as indicated by line 7—7 on FIG. 5.

Another special and added feature of this invention resides in the arrangement and construction of the solenoid operated on and off valve means V. The valve means V is a diaphragm type valve and includes a flat, disc-shaped synthetic rubber valving member 70 which is positioned to overlie the valve chamber 20 formed in and opening at the top 10 of the body B. The chamber 20 is an upwardly opening cylindrical cavity defined by an upwardly projecting annular mounting flange 71 at the top of the body and on which the perimeter edge portion of the valving member 70 is engaged in tight, clamped and sealed relationship therewith. The valving member 70 is held clamped onto and in fluid tight engagement with the flange 71 by a base flange 72 at the lower end of the actuating solenoid unit S and by means of screw fasteners carried by the base flange 72 and engaged in the body B, as shown in FIGS. 1 and 5 of the drawings. The solenoid unit S has a spring-loaded vertically shiftable armature (not shown) which is suitably fixed to the member 70 and which normally yieldingly urges the member 70 down in closed position and operates to lift the member 70 up and into an open position when the solenoid unit is energized.

The valve 20 has a central, vertical water outlet portion or passage 75, the lower end of which communicates with the inlet or upstream end of the nozzle passage 22 and the upper end of which is defined by an upwardly projecting annular sealing seat 76 which is normally engaged by the member 70. Spaced radially outward of the seat 76 is a vertical inlet port 77 which extends between and communicates with the chamber 20 and the water inlet passage 21.

In operation, when the solenoid unit is energized, the member 70 is elevated from sealing engagement with the seat 76 and water, flowing up from the passage 21 and into the chamber 20, outward of the seat 76, is free to flow over the seat and thence down through the water outlet passage 75 and into the nozzle passage 22.

While solenoid operated diaphragm valves of the general character illustrated and described in the foregoing are old in the art, they are commonly provided in independent form, that is, in a form in which they include independent, costly-to-make, bodies. Those valves are such that they must be connected with and between related fluid conducting elements and/or parts by couplings, nipples and various other means. Thus, when valves of the prior art are used, the resulting structures or apparatus are elongated or stretched out assemblies through which liquid takes notable time to flow. Such structures are slow to operate. With the structure that I provide, a separate and costly-to-make valve body is not provided and the time and parts which would be required to connect a separable common valve structure with the body B is eliminated. Further, The valve means V is incorporated within the body B in close or immediate adjacent relationship with its related passages 21 and 22, with the result that the construction is very compact and fast operating.

Another important feature of my invention resides in the fact that the body B is established of two easy and economical to make and assemble molded plastic parts. The two parts of the body are relatively thin-walled parts which are lightweight and inexpensive to make. In the prior art, where similar block-like bodies are provided in aspirator type liquid metering and mixing means or devices, the bodies have been established of solid blocks of material and the various passages, chambers and ports therein have been established by suitable drilling and other machine operations. Such prior art block-like bodies have required the performing of thread-tapping operations, the inserting of plugs and the like. As a result of the above, such prior art mixing and/or aspirating block-like body structures have been excessively costly to make and unsuitable for mass production.

While it is preferred that each of the previously noted novel and special features of my invention be established within and related to a block-like body such as is disclosed and described above, it is to be understood and it will be apparent that certain of those novel features can be embodied within and by structures fabricated of tubing stock or of combinations of tubing stock and other parts such as drilled or ported blocks, without departing from the broader aspects and spirit of my invention.

It is also to be noted that in practice, the valve means V shown at the right-hand end portion of the top side of the body B could be repositioned to occur at the right-hand end of the body B with its central outlet passage 23 in axial alignment with the nozzle passage 22, without changing or departing from the spirit of the invention. Further, the mixing chamber M could be rearranged to occur within and extend from the left end of the body B, with its axis parallel with the axis of the aspirator chamber 24, without departing from the spirit of this invention. In such a case, the body would be turned so that said left end or side would occur at or establish the bottom side of the body.

In practice, it has been found that in most instances the valve A or the regulator R is all that is required to attain desired adjustment and that to provide both the valve A and regulator R is somewhat redundant and unnecessarily adds to the cost of the construction. In such cases, if it is desired to eliminate one or the other of the valve A or regulator R, it is generally preferable to eliminate the valve A. It is anticipated that the cost savings to be attained by eliminating the valve A or regulator R will not be so great as to justify the elimination of either of those components in purchases of small numbers of units, but could be substantial and worth undertaking in those instances where the number of units purchases is substantial. In those instances where the ratio of concentrate and water is high, such as 15 or 20 to 1, fine tuning or adjusting of the unit is required and the provision and use of both the valve A and regulator R is required.

In accordance with the foregoing, it will be apparent that the structure illustrated is in fact but one preferred form and carrying out of the invention and that modifications of that structure to meet most special requirements can be easily made.

It is to be noted that in practice, the water supply line of tube W, delivering water to the regulator R, extends from a supply of water under pressure, such as a municipal water supply system, and that the inlet end of the suction hose H extends into a supply of liquid concentrate in a suitable container or vessel remote from and spaced below the unit U.

Having described only one typical preferred form and application of my invention, I do not wish to be limited to the specific details herein set forth, but wish to reserve to myself any modifications and/or variations that might appear to those skilled in the art and which fall within the scope of the following claims:

Having described my invention; I claim:

1. A liquid metering and mixing aspirator structure defining an elongate substantially horizontal cylindrical aspirator chamber with an upstream inlet end and a downstream outlet end, an elongate nozzle passage smaller in diameter than the aspirator chamber on an axis parallel with and laterally offset from the axis of and toward one side of the aspirator chamber and having its outlet end communicating with the upstream end of the aspirator chamber adjacent said one side thereof, an elongate liquid concentrate inlet port with an upstream inlet end and with a downstream outlet end communicating with the upstream end portion of the aspirator chamber at the other side thereof, an elongate cylindrical vertically extending mixing chamber with a closed upper end and an open lower end and larger in diametric extent and in flow capacity than the aspirator chamber and through which liquids received from the aspirator chamber flow by the force of gravity, the mixing chamber has an upper receiving end portion extending transverse and communicating with the outlet end of the apsirator chamber, water supply means connected with the inlet end of the nozzle passage and connected with a high pressure water supply and liquid concentrate supply means connected with the inlet end of the port and liquid jet deflecting means at the upper end portion of the mixing chamber and including a deflecting surface spaced downstream from the outlet end of the aspirator chamber and positioned in the path of and disposed to redirect liquids flowing from the aspirator chamber radially inwardly into the mixing chamber circumferentially and downwardly into vortex flow downwardly in and through the mixing chamber wherein said water jet deflecting means includes an elongate downwardly opening channel in a top surface of the mixing chamber continuing radially inwardly from the outlet end of the aspirator chamber and through which a portion of the liquids issuing from the outlet end of the aspirator chamber is directed, the end of the channel remote from the aspirator chamber terminates at the central portion of the mixing chamber and defines said deflecting surface.

2. The liquid metering and mixing aspirator structure set forth in claim 1 wherein the said mixing chamber has a downwardly and radially inwardly tapered cylindrical surface functioning to maintain vortex flow in the liquids flowing downwardly and circumferentially relative thereto.

3. The liquid metering and mixing aspirator structure set forth in claim 1 wherein said liquid concentrate supply means includes a container remote from said port and a supply of liquid concentrate in said container, a fluid conducting coupling part at the inlet end of said port and an elongate suction hose with one end connected with said coupling part and its other end opening in said supply of liquid concentrate.

4. The liquid metering and mixing aspirator structure set forth in claim 1 wherein said water supply means includes an on and off valve with an outlet passage communicating with the inlet end of the nozzle passage and an inlet passage communicating with a water outlet opening of a water pressure regulator, said water pressure regulator has a water inlet opening connected with a high pressure water supply, said liquid concentrate supply means includes a container remote from said port and a supply of liquid concentrate in said container, a fluid conducting coupling part at the inlet end of said port and an elongate suction hose with one end connected with said coupling part and its other end opening in said supply of liquid concentrate.

* * * * *